(No Model.)
P. AURIOL.
MECHANISM FOR TRANSMITTING POWER AT VARIABLE SPEED.
No. 578,536. Patented Mar. 9, 1897.
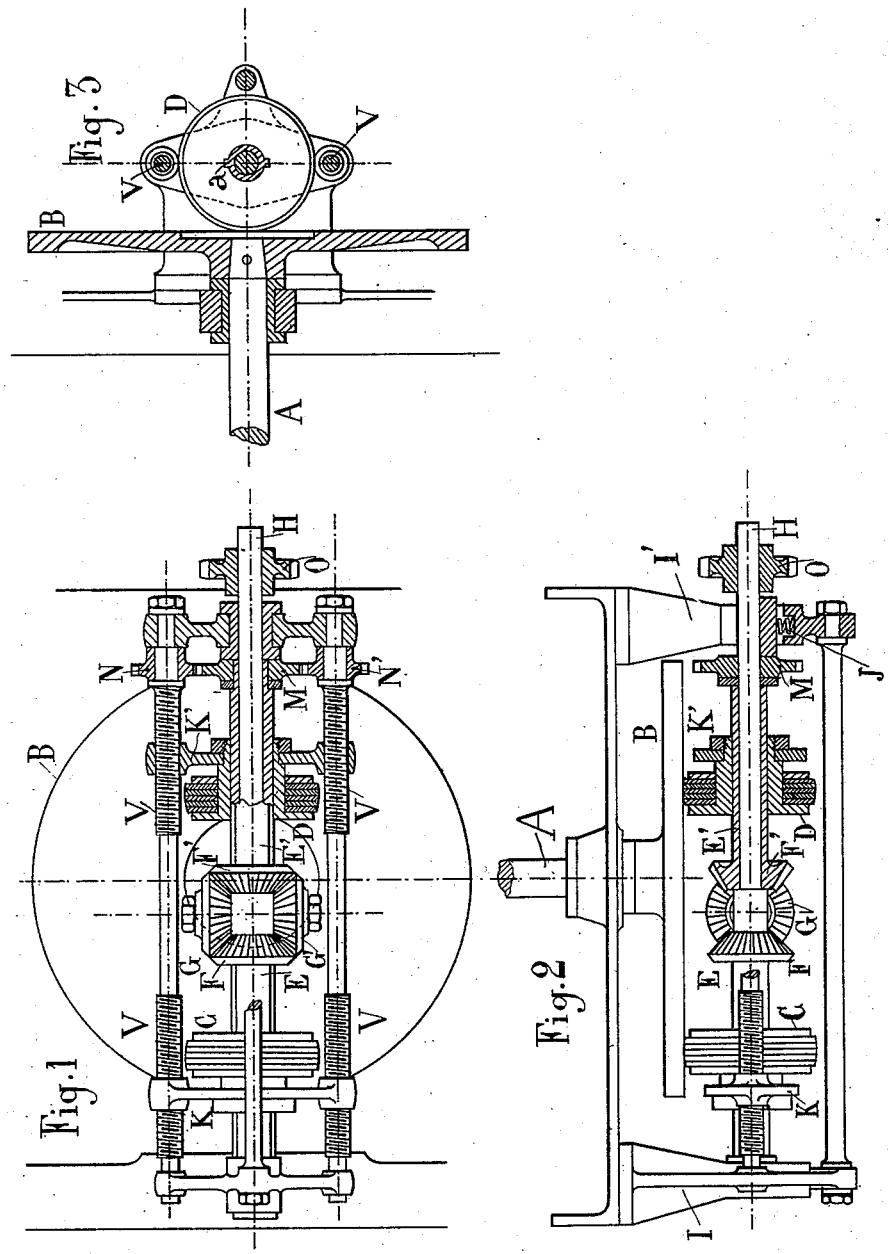
Witnesses:
J. C. Lebret.
O. Block.
Inventor:
Paul Auriol,
By H. A. de Vos.
Attorney.

UNITED STATES PATENT OFFICE.

PAUL AURIOL, OF PARIS, FRANCE.

MECHANISM FOR TRANSMITTING POWER AT VARIABLE SPEEDS.

SPECIFICATION forming part of Letters Patent No. 578,536, dated March 9, 1897.

Application filed June 27, 1896. Serial No. 597,103. (No model.) Patented in France January 4, 1896, No. 252,956.

*To all whom it may concern:*

Be it known that I, PAUL AURIOL, engineer, a citizen of the Republic of France, residing at 23 Rue Godot-du-Mauroi, Paris, in the Republic of France, have invented certain new and useful Improvements in and Relating to Mechanism for Transmitting Power at Variable Speeds, (for which I have obtained a patent in France, No. 252,956, dated January 4, 1896,) of which the following is a specification.

The present invention relates to a mechanism for the transmission without loss of mechanical power at variable speeds, the prime mover itself moving at its normal speed.

The essential feature of my invention is to have at command the power to transmit the maximum amount of work which the prime mover is able to produce—namely, the prime mover working continually at a normal speed, should resistance increase, the capability of opposing the same by a stronger force, but with diminished speed, and, vice versa, if the resistance decreases, the capability of diminishing the transmitting power and at the same time increasing the speed without shock and without the mechanism getting out of gear. This mechanism is particularly applicable to motor-cars, which on inclines necessitate a motor of greater power than on a level road, in which case the speed can be increased with less effort.

In the accompanying drawings, Figure 1 represents the mechanism in elevation and half in longitudinal section. Fig. 2 shows a plan view, partly in section, of Fig. 1. Fig. 3 is a vertical section through Fig. 1.

B is a disk mounted on a shaft A.

C D are two friction-rollers rotated by contact with the disk B in accordance with their relative position on opposite sides of the center of disk B. They are mounted according to the diameter of the disk B, and can be made to approach nearer to or farther away from the center of shaft A of disk B together. These rollers are faced with leather, compressed paper, or any other suitable material of good frictional qualities.

E E' are two hollow shafts or sleeves with a key $a$, each mounted upon a solid shaft H. On these two sleeves are mounted the two friction-rollers C D, which slide along the sleeves and can rotate therewith by the aid of the longitudinal key $a$.

F F' are two toothed bevel-pinions of equal pitch and diameter, one mounted, respectively, at the extremity of the sleeve E and the other at the extremity of the sleeve E'.

G G' are two satellite-pinions the shafts of which are fixed to a cross-bar in one piece with the shaft H, which turns in the hollow sleeves E E' with little friction.

The shaft H is supported at its extremities by the brackets I I', the brass bushes of which are pressed by springs J for the purpose of pressing the rollers C D with sufficient force against the disk B on the shaft A.

K K' are two traversing frames, to which are connected the center parts or bosses of the two friction-rollers C D. The traversing frames K K', carrying the friction-rollers C D, are caused to recede from or approach the center of the disk B through the medium of the operating-screws V V. These screws are rotated by means of the spur-and-pinion gear M N N'.

O is a pinion on the shaft H, which serves to transmit the variable-speed motion.

The machine acts as follows: If it is desired to have a high speed with a low-power prime mover, the friction-roller C being near the circumference of the disk B and the friction-roller D toward the center of the same, as they turn in opposite directions and at different velocities the satellite-pinions G G' will turn the shaft H with a speed equal to the difference of speed between the two friction-rollers C D. To obtain less speed, it will suffice to draw the friction-roller C toward the center of the disk B or to move the friction-roller D from the center, or, again, to draw in the one and remove the other.

To stop the transmission completely without stopping the motor, the two friction-rollers C D are brought to an equal distance from the center. The two friction-rollers turning in opposite directions at an equal velocity the satellite-pinions G G' would not be able to turn the shaft H. In order to obtain reverse motion, it suffices to place the friction-roller C toward the center and the friction-roller D toward the circumference of the disk B. A change of this speed is obtained in the same manner as for the forward movement by bringing the friction-roller D toward the center or by removing the friction-roller C from the same or by removing C from and bringing D toward the center, and finally the shaft is stopped by placing the two friction-rollers C D at equal distances from the center.

The bushes fixed in the brackets I may be dispensed with, in which case the disk B would press against the friction-rollers C D.

Having thus described my invention, what I claim as new, and desire to secure by Letters Patent, is—

1. In a power-transmitting mechanism, the combination with a rotating disk, of a shaft carrying gears, sleeves mounted to rotate upon the opposite ends of said shaft and having thereon gears meshing with the gears on said shaft, friction-rollers longitudinally movable on said sleeves and bearing against said disk at opposite sides of the center thereof, and means for moving said rollers toward and from the center of said disk, substantially as described.

2. In a power-transmitting mechanism, the combination with a rotating disk, of a shaft carrying gears at an angle thereto, sleeves located upon the opposite ends of said shaft to rotate thereon and having beveled gears meshing with the gears on said shaft, friction-rollers longitudinally movable on said sleeves and bearing against said disk at opposite sides of the center thereof, an operating-screw parallel with said shaft and having its ends threaded, carriers for said rollers engaging said operating-screw, and means for rotating said screw to shift said rollers longitudinally upon the sleeves, substantially as described.

3. In a power-transmitting mechanism, the combination with a rotating disk, of a shaft carrying gears, sleeves located upon the opposite ends of said shaft and having thereon gears meshing with the gears on said shafts, friction-rollers longitudinally movable on said sleeves and bearing against said disk at opposite sides of the center thereof, operating-screws upon opposite sides of said shaft, carriers for said rollers engaging said screws, gears upon said screws, and gearing meshing with the gears upon said screws to simultaneously rotate both screws, substantially as described.

4. In a power-transmitting mechanism, the combination with a rotating disk, of a shaft having an extension at an angle therefrom and beveled gears located upon said extension, sleeves upon the opposite ends of said shaft and having beveled gears thereon meshing with the gears upon said shaft, friction-rollers longitudinally movable upon said sleeve and bearing upon said disk at opposite sides of the center thereof, operating-screws upon opposite sides of said shaft, carriers for said rollers having screw-threaded extensions engaging said screws, and means for simultaneously rotating said screws, substantially as described.

Signed at Paris, France, this 20th day of May, A. D. 1896.

P. AURIOL.

Witnesses:
M. MERVILLE,
CLYDE SHROPSHIRE.